United States Patent [19]

Williams et al.

[11] 3,802,999

[45] Apr. 9, 1974

[54] PYRAZOMYCIN AND PROCESS FOR PRODUCTION THEREOF

[75] Inventors: Robert H. Williams; Marvin M. Hoehn, both of Indianapolis, Ind.

[73] Assignee: Eli Lilly and Company, Indianapolis, Ind.

[22] Filed: Feb. 14, 1972

[21] Appl. No.: 226,285

Related U.S. Application Data

[62] Division of Ser. No. 818,676, April 13, 1969, Pat. No. 3,674,774.

[52] U.S. Cl............................................. 195/80 R
[51] Int. Cl............................................. C12d 9/00
[58] Field of Search .................................. 195/80 R

[56] References Cited
UNITED STATES PATENTS

| | | | |
|---|---|---|---|
| 3,674,774 | 7/1972 | Williams et al. | 195/80 R X |
| 3,495,003 | 2/1970 | Hausmann et al. | 195/80 R X |

*Primary Examiner*—A. Louis Monacell
*Assistant Examiner*—Robert J. Warden
*Attorney, Agent, or Firm*—William B. Scanlon; Everet F. Smith

[57] ABSTRACT

Pyrazomycin is a new antibiotic produced by the fermentation of *Streptomyces candidus* NRRL 3601, having antiviral and antifungal activity.

3 Claims, 1 Drawing Figure

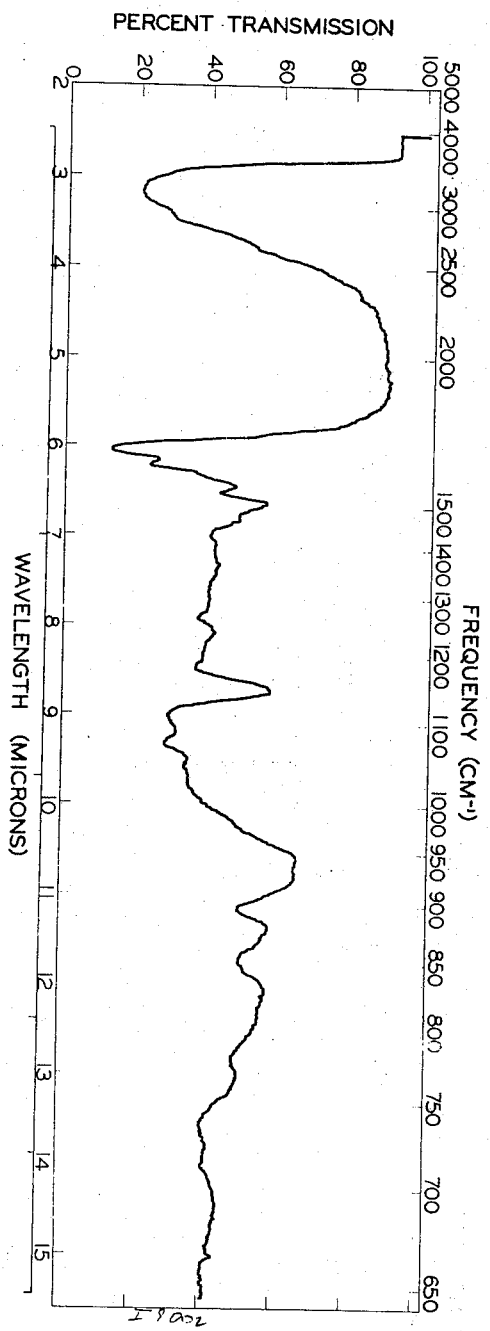

PYRAZOMYCIN AND PROCESS FOR PRODUCTION THEREOF

This is a division, of application Ser. No. 818,676 now U.S. Pat. No. 3,674,774, filed Apr. 13, 1969.

SUMMARY

Pyrazomycin is a new antibiotic produced by the fermentation of *Streptomyces candidus* NRRL 3601. The antibiotic and its salts exhibit in vitro and in vivo antiviral and antifungal activity.

DESCRIPTION OF PREFERRED EMBODIMENTS

Pyrazomycin (4-hydroxy-5(3)-ribofuranosylpyrazole-3(5)-carboxamide), also arbitrarily designated by the name antibiotic A23813, is a new antibiotic produced by the fermentation of *Streptomyces candidus* NRRL 3601.

When crystallized in water, pyrazomycin is obtained as colorless needles, m.p., 108°–113°C. Pyrazomycin is soluble in water, methanol, ethanol, propanol, and butanol, slightly soluble in ethyl acetate, and insoluble in hydrocarbon solvents and ethyl ether. The specific optical rotation $[\alpha]_D^{20}$ of crystalline pyrazomycin, dried at room temperature in vacuo over anhydrous calcium chloride for about 15 hours, was found to be −45.5° (C = 0.78 percent, w.v. (mg./ml.) in water).

Electrometric titration of pyrazomycin in a water solution revealed the presence of one titratable group of pK' a = 6.9.

The molecular weight of pyrazomycin, determined by mass spectral data, is 259.

The empirical formula of pyrazomycin is $C_9H_{13}N_3O_6$.

Elemental analysis of pyrazomycin gave the following values:

| Element | Percent | |
|---|---|---|
| | Theoretical | Found |
| Carbon | 41.70 | 41.56 |
| Hydrogen | 5.00 | 5.25 |
| Nitrogen | 16.20 | 16.02 |
| Oxygen | 37.10 | 36.25 |

Pyrazomycin is best represented by the structural formula:

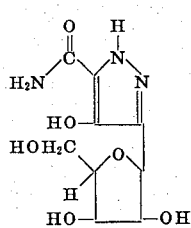

The infrared absorption spectrum of pyrazomycin, prepared as a potassium bromide pellet, is shown in FIG. 1 of the accompanying drawing. The distinguishable bands in the infrared spectrum over the range of 2.0 to 15.0 microns are as follows: 3.10; 3.40; 6.04; 6.21; 6.51; 6.80; 7.00; 8.50; 9.00; 9.30; 9.80; 11.20; 11.70; 12.90; 13.60; and 14.00 microns.

The ultraviolet spectrum of pyrazomycin obtained in acidic and neutral ethanol shows the following maxima: 232 m$\mu$ ($\epsilon$ = 7.4 × 10³), and 263 m$\mu$ ($\epsilon$ = 6.2 × 10³). There are minima at 213 and 242 m$\mu$. On addition of base, the spectrum shifts to maxima of 235 m$\mu$ ($\epsilon$ = 5.1 × 10³) and 307 m$\mu$ ($\epsilon$ = 5.1 × 10³), and minimum of 257 m$\mu$.

A powder X-ray diffraction pattern of pyrazomycin, using unfiltered chromium radiation and a wave length of 2.2896 A in calculating the interplanar spacings, gives the following values:

| d | $I/I_2$ | d | $I/I_2$ |
|---|---|---|---|
| 12.94 | .10 | 3.49 | .70 |
| 6.78 | .70 | 3.36 | .40 |
| 6.43 | .30 | 3.27 | .10 |
| 6.20 | .40 | 3.18 | .50 |
| 5.98 | .30 | 3.13 | .50 |
| 5.40 | .20 | 3.08 | .05 |
| 5.30 | .10 | 3.03 | .15 |
| 4.91 | .20 | 2.97 | .15 |
| 4.80 | .15 | 2.91 | .15 |
| 4.64 | 1.00 | 2.85 | .40 |
| 4.56 | .50 | 2.78 | .10 |
| 4.23 | .80 | 2.65 | .60 |
| 4.05 | .80 | 2.61 | .50 |
| 3.85 | .60 | 2.54 | .20 |
| 3.58 | .70 | 2.50 | .20 |
| 2.47 | .20 | 2.14 | .10 |
| 2.43 | .30 | 2.12 | .10 |
| 2.38 | .20 | 2.08 | .20 |
| 2.35 | .20 | 2.05 | .20 |
| 2.31 | .10 | 2.02 | .30 |
| 2.20 | .50 | 1.96 | .10 |
| 2.19 | .50 | 1.90 | .05 |

Pyrazomycin exhibits antifungal activity against *Neurospora spp.* and hence is useful, when incorporated into scrub solution and the like, for maintaining hospital surfaces, swimming pool areas, and the like, free of such fungal contamination.

Pyrazomycin is active in vivo against vaccinia and Herpes simplex, and is useful in treating viral infections such as small pox and cold sores at doses of from 0.5 to 250 mg./kg. daily. Pyrazomycin can be administered either orally or parenterally to warm-blooded mammals, such as mice, rats, dogs, and the like.

The in vitro activity of the above compounds against virus growth in tissue culture has been demonstrated against a number of viruses, including measles virus, Herpes simplex, vaccinia, and Coxsacki.

The ability of pyrazomycin to control the virus growth in vitro is readily demonstrated by using a plaque suppression test similar to those described by Siminoff, Applied Microbiology, 9 (1) 66–72 (1961), and DeLong, D. C. et al., "Biological Evaluation of A10598," Annual of N.Y. Academy of Science 130, 44–48 (1965).

In the antiviral evaluation, plaques are seen in those areas of the plate where the virus has infected and reproduced in the cells. Zones of toxicity are also observed and the diameter thereof measured in millimeters when the test compound has a lethal cytological effect on host cells under and around the filter paper disc. Antiviral activity of the test compound is detected by observing the absence of plaques and a heavier growth of cells in a zone under and around a filter paper disc, the diameter of this zone being measured in millimeters.

The cells in a zone of activity are examined with a microscope to determine the presence and degree of drug and/or virus damage. The staining is graded 1+, 2+, 3+, 4+, and negative to reflect the following:

4+. Dark stained areas which, upon microscopic examination, show healthy cells with no visible virus or drug damage;

3+. Less darkly stained areas that show no virus or drug damage but appear less healthy;

2+. Areas showing healthy cells with a moderate amount of virus breakthrough;

1+. Areas showing healthy cells with a greater virus breakthrough;

—. No viable cells.

Table I which follows sets forth the results of the testing of pyrazomycin salts against measles virus (Edmondston strain), vaccinia (VI Lindeman), Coxsacki, and Herpes simplex. In the table, column 1 gives the concentration in terms of mcg./ml. at which pyrazomycin was applied to the filter paper discs; column 2, the diameter in millimeters of the zone of virus inhibition by the test compound; column 3, the grading of stained areas; and column 4, the name of the virus against which the compound was tested.

TABLE I

IN VITRO ANTIVIRAL ACTIVITY OF PYRAZOMYCIN

| Conc. mgc./ml. | Zone mm. | Microscopic Examination | Virus |
|---|---|---|---|
| 1000 | 60 | 4+ | Vaccinia |
| 500 | 50 | 4+ | Vaccinia |
| 250 | 50 | 4+ | Vaccinia |
| 125 | 50 | 4+ | Vaccinia |
| 62 | 50 | 4+ | Vaccinia |
| 31 | 40 | 4+ | Vaccinia |
| 15 | 25 | 4+ | Vaccinia |
| 7 | 22 | 4+ | Vaccinia |
| 3.5 | 20 | 4+ | Vaccinia |
| 1000 | 28 | 3+ | Herpes Simplex |
| 500 | 35 | 3+ | Herpes Simplex |
| 250 | 33 | 3+ | Herpes Simplex |
| 125 | 30 | 3+ | Herpes Simplex |
| 62 | 30 | 3+ | Herpes Simplex |
| 31 | 25 | 3+ | Herpes Simplex |
| 15 | 22 | 2+ | Herpes Simplex |
| 7 | 12 | 2+ | Herpes Simplex |
| 3.5 | 10 | 2+ | Herpes Simplex |
| 1000 | 50 | 4+ | Measles |
| 500 | 43 | 4+ | Measles |
| 250 | 43 | 4+ | Measles |
| 125 | 37 | 4+ | Measles |
| 62 | 30 | 4+ | Measles |
| 31 | 37 | 4+ | Measles |
| 15 | 30 | 4+ | Measles |
| 7 | 22 | 4+ | Measles |
| 3.5 | 20 | 4+ | Measles |
| 1.5 | 15 | 4+ | Measles |
| 0.75 | 11 | 4+ | Measles |
| 1000 | 33 | 2+ | Coxsacki |
| 500 | 35 | 2+ | Coxsacki |
| 250 | 33 | 2+ | Coxsacki |
| 125 | 30 | 2+ | Coxsacki |
| 62 | 30 | 2+ | Coxsacki |
| 31 | 30 | 1+ | Coxsacki |
| 15 | 15 | 1+ | Coxsacki |
| 7 | 15 | 1+ | Coxsacki |
| 3.5 | 11 | 1+ | Coxsacki |

Pyrazomycin can be produced by culturing a hitherto unknown strain of *Streptomyces candidus* under aerobic conditions in a culture medium containing assimilable sources of carbon, nitrogen, and inorganic salts. The organisms were first isolated from soil samples obtained from India.

The organisms were isolated from the above soil samples by suspending portions of the soil samples in sterile distilled water, and by streaking the suspensions on nutrient agar plates. The seeded nutrient agar plates were incubated at about 30°C. for several days. At the end of the incubation time, colonies of the pyrazomycin-producing organisms were transferred by means of a sterile platinum loop to agar slants. The inoculated agar slants were then incubated to provide larger amounts of inoculum for the production of pyrazomycin.

The novel organism capable of producing pyrazomycin has been placed on permanent deposit, without restriction, with the culture collection of the Northern Utilization Research and Development Division, Agricultural Research Service, U.S. Department of Agriculture (Formerly Northern Regional Research Laboratories), Peoria, Illinois, and is available to the public under culture No. NRRL 3601.

Because of the uncertainty of taxonomic studies with the *Streptomyces* group of organisms, there is always an element of doubt associated with the classification of a newly discovered organism. However, the organism which produces pyrazomycin appears to resemble most nearly, in its most important characteristics, the published description of the organism *Streptomyces candidus* (Krassilnikov) Waksman on the basis of a published description, Waksman, The Actinomycetes Vol. 2 Classification, Identification and Description of Genera and Species. The Williams and Wilkins Co., Baltimore, Maryland (1963).

Culture NRRL 3601 is assigned to the Rectus-Flexibilis section, White series of Pridham et al. (Pridham et al., "A Guide for the Classification of Streptomycetes According to Selected Groups," Applied Microbiol. 6: 52–79 (1958) ), and also to either the white or yellow series of the Tresner and Backus system (Tresner and Backus, "System of Color Wheels for Streptomycete Taxonomy." Applied Microbiol. 11: 335–338 (1963)). As stated above, the pyrazomycin-producing organism has been classified as a strain of *Streptomyces candidus*. It should be noted, however, that other species, namely *Streptomyces alboflavus* and *Streptomyces longissimus* are also similar to *Streptomyces candidus* NRRL 3601.

Generally speaking, *Streptomyces candidus* NRRL 3601 produces flexuous sporophores and cylindrical, smooth spores which are from white to pale yellow en masse. The vegetative mycelium is yellow to orange-yellow. A light yellow to light brown soluble pigment is present in two media and absent in all other media. Fascicles of aerial mycelium and sclerotia-like bodies occur on most media.

The methods employed in the taxonomic studies of the pyrazomycin-producing strain of *S. candidus* were those recommended for the International Streptomyces Project described by Shirling and Gottlieb, "Methods for Characterization of *Streptomyces* Species," Intern. Bull. Systematic Bacteriol.: 16, 313–340 (1966), along with other supplementary tests. Carbon utilization tests were carried out according to the method described by Pridham and Gottlieb, J. Bac. 56: 107 (1948). The data obtained from the taxonomic studies are shown in tabular form below. Color names were assigned according to the ISCC-NBS method (Kelly and Judd, "The ISCC-NBS Method of Designating Colors and a Dictionary of Color Names." U.S. Dept. of Commerce Circ. 553. Washington, D.C.). Figures in parentheses refer to Tresner and Backus color series (Tresner and Backus, "System of Color Wheels for Streptomyces Taxonomy," Appld. Microbiol. 11:

335–338 (1966)). Maerz and Paul color blocks are enclosed in brackets. (Maerz and Paul, Dictionary of Color, McGraw-Hill, New York (1950)). Cultures were grown at 30°C. for 14 days unless otherwise noted.

TABLE

| Description of Culture NRRL 3601 | |
|---|---|
| Property Observed | Characteristics of NRRL 3601 |
| Morphology | Flexuous sporophores were produced on fascicled aerial mycelium; the spores are cylindrical, measuring 0.67 to 1.0 μ by 1.7 to 2.7 μ, with smooth spore surfaces as observed in electron micrographs. |
| Cultural Characteristics on: | |
| Yeast malt agar | Growth abundant, reverse medium yellow [11J6]; aerial mycelium and sporulation moderate, white (W) a; no soluble pigment; sclerotia formed. |
| Oatmeal agar | Growth moderate, reverse yellowish white [9C1]; aerial mycelium and sporulation moderate, white (W) a; no soluble pigment; sclerotia formed. |
| Inorganic salts and starch | Growth moderate, reverse medium yellow [10H4]; aerial mycelium moderate, sporulation fair, yellowish white (Y) 2ba [9D2]; soluble pigment sparse brown; sclerotia present. |
| Glycerol-Asparagine agar | Growth moderate, reverse vivid yellow [9J5]; aerial mycelium and sporulation fair, white (W) a; no soluble pigment. |
| Czapeks' agar | Growth abundant, reverse vivid yellow [11J5]; aerial mycelium fair, white (W) a, no sporulation; no soluble pigment. |
| Glucose-asparagine | Growth abundant, reverse medium yellow [11J6]; aerial mycelium abundant, sporulation fair, pale yellow (Y) 2ba [9D2]; no soluble pigment. |
| Tyrosine agar | Growth moderate, reverse light grayish brown [11B2]; aerial mycelium moderate, white (W) a, sporulation scant, no soluble pigment; sclerotia present. |
| Nutrient agar | Growth moderate, reverse pale yellow green [10B1]; aerial mycelium sparse, no sporulation; no soluble pigment; sclerotia present. |
| Calcium malate | Growth abundant, reverse medium yellow [10J5]; aerial mycelium and sporulation moderate, pale orange yellow (R) 3ca [9E3]; soluble pigment light yellow. |
| Glycerol-glycine | Growth abundant, reverse medium yellow [11J6]; aerial mycelium moderate, sporulation fair, white (W) a; no soluble pigment. |
| Tomato paste-oatmeal | Growth abundant, reverse medium orange to medium orange yellow [10J7]; aerial mycelium and sporulation abundant, pale yellow (Y) 2ba [9D2]; no soluble pigment. |
| Emerson's agar | Growth abundant, reverse light yellow [10G3]; aerial mycelium sparse, no sporulation; no soluble pigment. |
| Bennetts' agar | Growth abundant, reverse medium orange yellow [10I6]; aerial mycelium abundant, sporulation fair, white (W) a; no soluble pigment. |

TABLE-Continued

| Description of Culture NRRL 3601 | |
|---|---|
| Property Observed | Characteristics of NRRL 3601 |
| Action on milk | Slight coagulation and some clearing at 14 days. |
| Nitrate reduction | Slight reduction at 14 days. |
| Melanin production on: | |
| Peptone-iron agar | Negative |
| Tryptone-yeast extract broth | Negative |
| Gelatin liquefaction | Complete at 14 days. |
| Temperature requirements | Growth on yeast malt agar from 26° to 37°; no growth at 43°. |
| Response of substrate color to pH change | Unaffected |
| Carbon Utilization | |
| L-arabinose | + |
| sucrose | + |
| D-xylose | + |
| D-fructose | + |
| i-inositol | + |
| D-mannitol | + |
| D-dextrose | + |
| maltose | + |
| melizitose | (−) |
| cellulose | (−) |
| minus carbon (control) | − |

Utilization code:
+ = positive utilization
(+) = probable utilization
(−) = questionable utilization
− = no utilization The culture medium employable in producing pyrazomycin by cultivating the above-described organism can be any one of several media, since, as is apparent from the above utilization tests, the organism is capable of utilizing different energy sources. However, for economy of production, maximum yield of antibiotic, and ease of isolation of the antibiotic, certain relatively simple nutrient sources are preferable. For example, the media which are useful in the production of the antibiotic include an assimilable source of carbon such as dextrose, dextrine, glycerol, and the like. The presently preferred source of carbon is dextrose. Additionally, employable media include a source of assimilable nitrogen such as soybean meal, corn steep solids, yeast, cottonseed meal, beef extract, peptones (meat or soy), casein, amino acid mixtures and the like. Presently preferred sources of nitrogen are peptones, yeast extracts, amino acid mixtures, and the like. Among the nutrient inorganic salts which can be incorporated in the culture media are the customary salts capable of yielding sodium, potassium, ammonium, calcium, phosphate, sulfate, chloride, carbonate, and like ions.

Minor elements necessary for optimum growth and development of the organism used for the production of pyrazomycin should also be included in the culture medium. Such trace elements commonly occur as impurities in the other constituents of the medium in amounts sufficient to meet the growth requirements of the actinomycete employed in this invention.

The initial pH of the culture medium can be varied. However, it has been found desirable that the initial pH of the medium be between about 6.0 to about 7.5. As has been observed with other actinomycetes, the pH of the medium gradually increases throughout the growth period of the organism while the antibiotic is being produced, and may attain a level of from about 6.5 to 8.0 or above, the final pH being dependent at least in part on the initial pH of the medium, the buffers present in the medium, and the period of time the organism is permitted to grow.

Submerged, aerobic cultural conditions are the conditions of choice for the production of pyrazomycin. For preparation of relatively small amounts, shake flask and surface culture in bottles can be employed; but for the preparation of large amounts, submerged aerobic culture in sterile tanks is preferred. The medium in the sterile tank can be inoculated with a sporulated suspension; but because of the growth lag experienced when a sporulated suspension is used as the inoculum, the vegetative form of the culture is preferred. By thus avoiding the growth lag, more efficient use of the fermentation equipment is realized. Accordingly, it is desirable first to produce a vegetative inoculum of the organism by inoculating a relatively small quantity of culture medium with the spore form of the organism; and when a young, active vegetative inoculum has been obtained, to transfer the vegetative inoculum aseptically to the large tank. The medium in which the vegetative inoculum is produced can be either the same or different from the medium utilized for the large scale production of pyrazomycin.

The organism which produces pyrazomycin will grow over a wide temperature range between 25°–37°C. Optimal production of pyrazomycin seems to occur at temperatures of 25°–30°C. In general, maximum production of the antibiotic occurs within about 24–72 hours after inoculation of the culture medium.

As is customary in aerobic, submerged culture processes, sterile air is blown through the culture medium. For efficient growth of the organism and pyrazomycin production, the volume of air employed in the tank production of pyrazomycin is from 0.35 to 0.80 volume of air per minute per volume of culture. The preferred volume is 0.40 of air per minute per volume of culture medium.

The concentration of antibiotic activity in the culture medium can be followed readily during the fermentation period by testing samples of the culture medium for their inhibitory activity against the growth of organisms known to be inhibited by the presence of pyrazomycin. The organism *Neurospora spp.* has been found useful for this purpose. The testing of the samples can be carried out by the well-known, cup-plate method.

In general, maximum production of pyrazomycin occurs within about two to three days after inoculation of the culture medium in submerged aerobic culture or shake flask culture processes.

The antibiotic activity produced during the fermentation of pyrazomycin can occur either in the antibiotic broth and/or in the mycelium. Accordingly, isolation techniques employed in the production of pyrazomycin are designed to permit maximum recovery of the antibiotic from either or both sources. Thus, for example, the fermentation broth as obtained may be filtered and the antibiotic recovered by adsorption from the filtrate using a suitable adsorbent, such as carbon, eluting the activity from the adsorbent with, for example, an acetone-water eluant. The crude pyrazomycin is further purified by ion exchange chromatography and gel filtration. In addition, the residual antibiotic present in the mycelial cake can be recovered by thorough extraction with a suitable solvent such as methanol. However, from 75–95 percent of the activity has been found in the broth.

In order to illustrate more fully the operation of the invention, the following examples are provided by way of illustration.

EXAMPLE 1

Shake Flask Production of Pyrazomycin

Spores of *Streptomyces candidus* NRRL 3601 were inoculated on nutrient agar slants. The nutrient agar medium comprises 10 g. of dextrin, 2 g. of an enzyme digested casein, 1 g. of beef extract, 1 g. of yeast extract, 20 g. of agar and sufficient distilled water to make a total volume of 1 liter. The slants are inoculated with spores of *Streptomyces candidus* NRRL 3601 and incubated for four to six days at 30°C. The mature slant cultures were covered with sterile distilled water and gently scraped with a loop to loosen the spores and provide an aqueous suspension thereof. One milliliter of the resulting spore suspension was used to inoculate each 100 ml. portion of vegetative medium.

The vegetative culture medium was prepared by combining 15 g. of glucose, 15 g. of soybean meal, 5 g. of cornsteep solids, 2 g. of calcium carbonate, and 5 g. of sodium chloride with sufficient tap water to make the total volume 1 liter.

The vegetative inoculum was shaken for 48 hours at 30°C. on a reciprocal shaker having a 2-inch stroke at 108 r.p.m. The inoculum so prepared was then utilized in the production of pyrazomycin as follows:

A production medium was prepared having the following composition:

| | |
|---|---|
| Soybean meal | 15 g./l. |
| Casein | 1 g./l. |
| NaNO$_3$ | 3 g./l. |
| Glucose syrup | 20 g./l. |
| CaCO$_3$ | 2.5 g./l. |
| Tap water | |

100 milliliter portions of the production medium were placed in 500 milliliter Erlenmeyer flasks, which were then sterilized at 120°C. for 30 minutes. When cooled, each flask was inoculated with a 5 percent vegetative inoculum prepared as previously described.

The production flasks were shaken for 48 hours at 30°C., on a rotary shaker having a 2-inch arc operating at 250 r.p.m. The pH of the uninoculated medium varied over a pH range of 6.0 to 7.5. The harvest pH at the end of the fermentation cycle was between 6.5 and 8.0. The antifungal and antiviral activity of pyrazomycin was found in both the broth and the mycelium. The activity was determined by assaying the broth and the mycelium against *Neurospora spp.* Isolation of pyrazomycin was carried out as described in Example 2.

EXAMPLE 2

Pilot Plant Production of Pyrazomycin

The production of pyrazomycin by submerged fermentation on a pilot plant scale is illustrated by the following example.

To a 250 ml. flask containing 50 ml. of a vegetative medium comprising 10 g./l. of dextrose, 25 g./l. of dextrin, 20 g./l. of soy peptone, 5 g./l. of Nadrisol distiller's solubles, and tap water, having a pH of 6.6, was added a lyophile pellet made from the mature nutrient agar slant cultures described in Example 1.

The inoculated vegetative medium was incubated at about 30°C. for 48 hours on a rotary shaker having a 2-inch diameter arc, operating at 250 r.p.m. The terminal pH of the medium was found to be 7.0. A 20 ml. portion of the vegetative culture so obtained was employed to inoculate a 1 liter flask containing 100 ml. of the vegetative medium. The inoculated vegetative medium was incubated at about 30°C. for 48 hours on a rotary shaker having a 2-inch diameter arc, operating at 250 r.p.m. The terminal pH at the end of the second stage was 7.4. A 500 ml. portion of the vegetative culture as obtained was employed to inoculate a 40 liter fermenter containing 25 liters of a sterilized aqueous fermentation medium comprising 0.2 g./l. of Dow Corning Antifoam A, 20 g./l. of glycerol, 5 g./l. of soy peptone, 2 g./l. of calcium nitrate, 0.5 g./l. of sodium chloride, 3 g./l. of Nadrisol distiller's solubles, and tap water to bring the volume up to 25 liters. The fermentation was maintained at a temperature of 30°C. for 42 hours after inoculation. Agitation at the rate of 420 r.p.m. was carried out throughout the fermentation. Aeration throughout the fermentation was at a rate of 0.4 cubic feet of air per cubic foot of medium per minute. The terminal pH was 7.6.

The fermentation was harvested and the whole broth filtered. To 25 liters of filtered broth was added 10 percent (w./v.) of Pittsburg 12 × 40 mesh carbon. After stirring for 30 minutes, the mixture was filtered and washed with water. The activity was eluted from the carbon by three successive treatments with 9 liters of a 1:1 acetone-water solvent. The acetone-water eluates were combined and concentrated to a volume of about 500 ml. The concentrate was then passed through a 250 cc. Dowex 50W-X2 (H+ cycle) resin column, and the column washed with water. The activity is not exchanged onto the resin, and thus was collected in the effluent volume and subsequent water washes. The effluent and water washes were combined and the pH adjusted to approximately 7.0. The solution was then concentrated and applied to a 5.0 × 80 cm. Sephadex G-10 dextran gel column in water. The column was eluted with water and the active fractions (assayed by disc plate assay of *Neurospora spp.* X-846) were combined, concentrated, and freeze-dried. Final purification was accomplished by column chromatography on an Avicel cellulose column equilibrated and eluted with 70 percent propanol. The freeze-dried active preparation from the Sephadex column was dissolved in a minimal amount of 70 percent propanol and applied to a 2.2 cm. × 60 cm. Avicel cellulose column. The active fractions were combined and concentrated to an aqueous solution and allowed to crystallize, to yield 850 mg. of pyrazomycin, m.p., 108°–113°C., pK'a = 6.9 (water).

Analysis, calc. for $C_9H_{13}N_3O_6$: C, 41.70; H, 5.00; N, 16.20 O, 37.10.
Found: C, 41.56; H, 5.25; N, 16.02 O, 36.25.

We claim:
1. A method of producing pyrazomycin comprising cultivating a pyrazomycin-producing strain of *Streptomyces candidus* NRRL 3601 in a culture medium containing assimilable sources of carbon, nitrogen, and inorganic salts under submerged aerobic conditions until a substantial amount of pyrazomycin is produced by said organism in said culture medium.

2. A method according to claim 1 wherein the culture medium is maintained at a temperature of from approximately 25°C. to approximately 37°C. and the growth period is carried out for a period of from approximately 24 to approximately 72 hours.

3. A method according to claim 2 additionally comprising recovering the pyrazomycin from said culture medium.

* * * * *